ELECTRICAL CONNECTION DEVICE

Original Filed July 30, 1965

ALBERT B. WELCH
INVENTOR
BY Robert M. Sperry
ATTORNEY 3,486,156
Patented Dec. 23, 1969

1

3,486,156

ELECTRICAL CONNECTION DEVICE

Albert B. Welch, Dallas, Tex., assignor to LTV Aerospace Corporation, Dallas, Tex., a corporation of Delaware Original application July 30, 1965, Ser. No. 476,604, now Patent No. 3,350,776, dated Nov. 7, 1967. Divided and this application Sept. 15, 1967, Ser. No. 667,997.
Int. Cl. H01c 15/02
U.S. Cl. 338—1 7 Claims

ABSTRACT OF THE DISCLOSURE

An apparatus for making electrical connections includes a container having a plurality of electrodes and containing a mixture of thermosetting, electrically insulating material and powdered, paramagnetic, electrically conductive material. A magnetic field is applied across the container between a selected pair of the electrodes to align particles of the powdered material between a pair of electrodes. Means for applying an electrical charge is then connected across the two electrodes to weld the aligned particles into an electrically conductive path. Means are also provided for removing the conductive path.

This invention relates to electrical connections and is particularly directed to novel apparatus for making electrical connections. This application is a division of patent application Ser. No. 476,604, issued as Patent No. 3,350,776.

In electronic computers and the like, it has often been proposed heretofore to make electrical connections hv means of coherers. Following the teachings of the prior art, coherers have generally comprised a quantity of powdered metal or the like contained between and in contact with two or more electrodes. By applying a predetermined voltage across a selected pair of the electrodes of such a device, the powder can be "welded" to provide an electrically conductive path between the selected electrodes. However, the coherers of the prior art have been subject to numerous disadvantages. For example, the quality of the "welds" obtained by prior art techniques has been poor. Consequently, the establishment of conductive paths by this technique has been unreliable. Moreover, the slightest jar has often been sufficient to break the weld. Thus, circuits employing such devices have had virtually no mechanical shock resistance. Furthermore, where attempts have been made to complete a plurality of circuits through a single coherer, short circuits have been a severe problem. In addition, the coherers of the prior art have been "one-shot" devices. That is, once a conductive path has been established from one electrode to a second electrode, it is not possible, with prior art coherers, to destroy this path and establish a new path from said one electrode to a third electrode.

These disadvantages of prior art coherers are overcome with the present invention and apparatus for making electrical connections are provided which permit positive and reliable welding of the particles forming a conductive path between selected electrodes. Moreover, with the technique of the present invention, the shock resistance of the conductive path is greatly improved while the possibility of short circuiting is substantially reduced. Furthermore, the technique of the present invention makes it possible to destroy an undesired conductive path and to reconnect the electrodes in new paths. In addition, the present invention permits a plurality of independent conductive paths to be connected to a common electrode.

The advantages of the present invention are preferably attained by replacing the powdered metal with a mixture of thermosetting plastic and a powder formed of a paramagnetic, electrically conductive material. With this arrangement, a magnetic field can be provided between selected electrodes, prior to application of the welding charge to align the particles of the powder and provide a stronger and more reliable weld. Moreover, the heat developed by the welding charge serves to form a solid, insulating sheath about the conductive path which reduces the possibility of short circuiting between adjacent paths and which is sufficiently resilient to withstand relatively strong mechanical shocks. Furthermore, by providing electrodes which are large compared to the size of particles of the conductive material, it is found that a plurality of conductive paths can be established between a common electrode and other selected electrodes. In addition, it is found that by applying a relatively strong electrical charge across an undesired path, the conductivity of the path can be destroyed. Consequently, the circuit can be revised as often as desired without replacing the connecting device.

2

Accordingly, it is an object of the present invention to provide improved apparatus for making electrical connections.

Another object of the present invention is to provide apparatus for improving the mechanical shock resistance of coherers.

An additional object of the present invention is to provide apparatus for forming insulated conductive paths between the electrodes of coherers.

A further object of the present invention is to provide apparatus which permit destruction of an established conductive path between the electrodes of a coherer and establishment of an alternative conductive path.

A specific object of the present invention is to provide a device for making electrical connections comprising a plurality of spaced electrodes; and mixture of a thermosetting plastic and a quantity of powdered, paramagnetic, electrically conductive material located between and in engagement with said electrodes.

These and other objects and features of the present invention will be apparent from the following detailed description taken with reference to the figures of the accompanying drawing.

Figure 1:
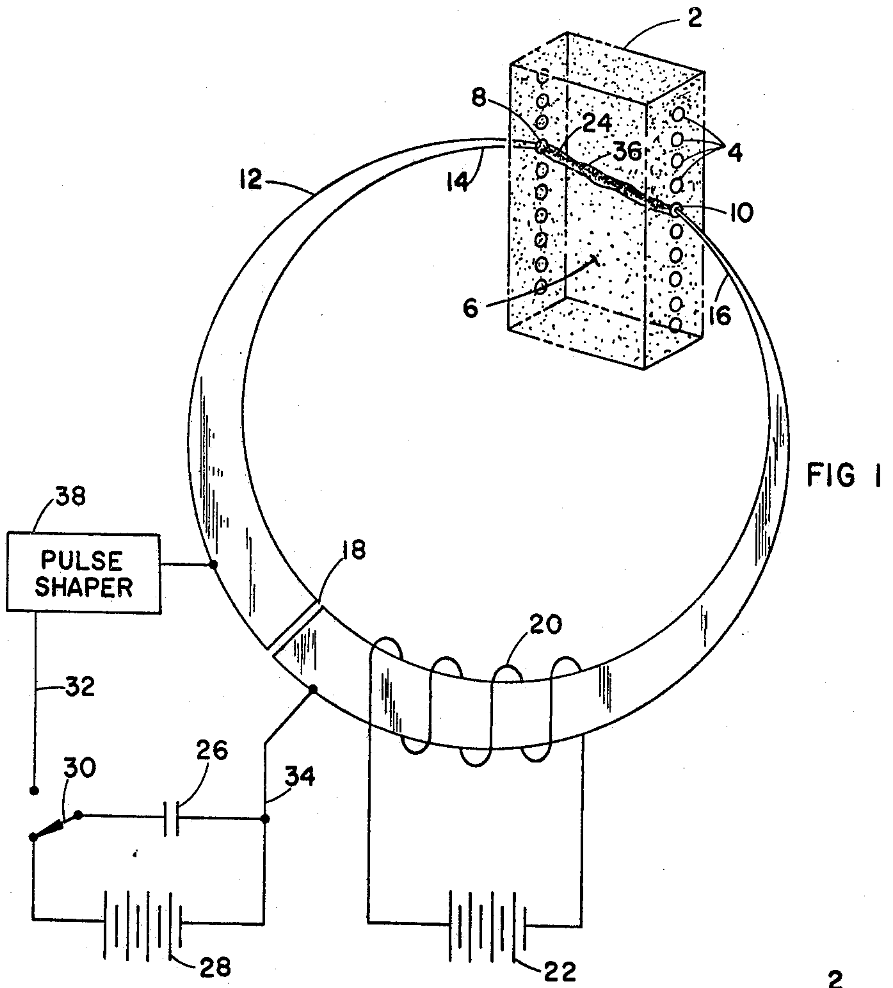
FIGURE 1 is a diagrammatic representation of apparatus for making electrical connections embodying the present invention.

In that form of the present invention chosen for illustration in FIGURE 1, a hollow container 2 is provided, formed of non-magnetic, non-conductive material and having a plurality of electrodes mounted thereon communicating between the interior and exterior surfaces of the container 2. The container 2 is filled with a mixture 6 of a thermosetting, electrically insulating plastic material with a quantity of electrically conductive, paramagnetic, powdered material which extends between and engages the surfaces of the electrodes 4 within the container 2.

To establish an electrical connection between any two selected electrodes, such as electrodes 8 and 10, a probe 12 is provided, formed of a material of low magnetic reluctance and having two ends, indicated at 14 and 16, which are insulated from each other by an air gap, as seen at 18, or other suitable means. By placing the ends 14 and 16 of the probe 12 on the selected electrodes 8 and 10, as shown in FIGURE 1, a magnetic field may be established in the probe 12, as by solenoid 20 and battery 22, which passes through the container 2, between the selected electrodes 8 and 10, causing the paramagnetic particles in the mixture 6 to align themselves to form a "chain" between the electrodes 8 and 10, as seen at 24. Subsequently, a predetermined quantity of electric charge may be passed from electrode 8, through the "chain" 24, to electrode 10 to weld the particles of "chain" 24 together to form an electrically conductive path connecting electrodes 8 and 10. For example, a capacitor 26 may be charged by a battery 28 to provide a predetermined charge. Thereafter, capacitor 26 may be discharged through switch 30, lead 32, end 14 of probe 12, electrode 8, "chain" 24, electrode 10, end 16 of probe 12, and lead 34 to weld the particles of "chain" 24. Simultaneously, the heat generated during the welding serves to set the thermosetting plastic to form an insulated sheath about the chain 24, as indicated at 36.

This procedure may be repeated as often as desired to establish substantially any number of insulated, conductive paths between selected pairs of electrodes. Since each conductive path is encased in its own insulating sheath, the problem of short circuiting between adjacent conductive paths is eliminated. Moreover, the insulating sheaths have considerable resilience. Consequently, even if the device is subjected to mechanical shocks which would be sufficient to break the chains, the sheaths will tend to retain the components of the chains in contact with each other so that the conductive path will not be destroyed. Thus, the mechanical shock resistance of the device of the present invention is far superior to the devices of the prior art.

It will be understood that the longer the magnetic field is applied, prior to the application of the welding charge, the more particles of the paramagnetic material will become aligned to form the chain 24. Consequently, the resistance of the conductive paths can be controlled by regulating the length of time that the magnetic field is applied before the welding charge. Moreover, the thickness of the insulating sheath can be controlled by regulating the length of time that an electric current of sufficient magnitude to cause heating is passed through the chain 24. If desired, a pulse shaping circuit, as indicated at 38, may be included in the charging circuit to supply shaped electrical pulses having a peak, to weld the chain, and a tail, to set the plastic.

Figure 2:
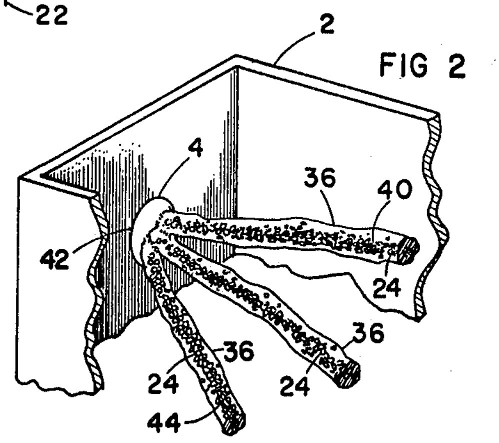
FIGURE 2 is an enlarged view of a detail of the apparatus of FIGURE 1.

In some instances, it may be desirable to connect several conductive paths to a single electrode, for example, to establish parallel circuits. To permit this, the surface area of the electrodes 4 is preferably made large compared to the expected cross-sectional area of the chains 24, as shown in FIGURE 2. With this arrangement, a first conductive path 40 is established between the common electrode 42 and a first other electrode (not shown), in the manner described with respect to FIGURE 1. Thereafter, a second conductive path 44 may be established between common electrode 42 and a second other electrode, not shown, in the same manner. This process may be repeated until all the desired connections have been made.

It may also be desired to revise the circuits through the connection device of the present invention. Thus, it may be desired to disconnect one electrode from a second electrode and to re-connect one or both of these electrodes to other electrodes. Furthermore, it may be desirable to accomplish such revision without disturbing other existing connections through the device. In accordance with the present invention, this may be accomplished by applying a relatively large electrical charge across a conductive path which is to be disconnected to "burn out" the chain, in a manner similar to that which occurs when a fuse is overloaded. The new circuit may then be established as described above. This technique may be repeated as often as desired and, since no mechanical operations are involved, circuitry may be provided to initiate such revision either manually or by remote control.

Figure 3:
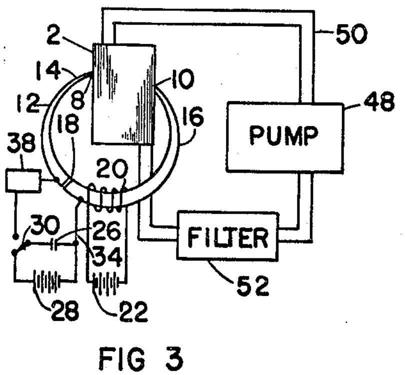
FIGURE 3 is a diagrammatic representation of an alternative form of the apparatus of FIGURE 1.

It will be seen that when a conductive path is destroyed, in the manner described above, the insulating sheath will remain substantially intact. Ordinarily, this will present no problem. However, where frequent circuit revision is required, it may be desirable as shown in FIGURE 3, to circulate the mixture of thermosetting plastic with the paramagnetic powder through the container 2, by means of pumps 48 and conduits 50 or the like. When this is done, the flow rate of the mixture may be made such that an insulating sheath, from which the chain has been burned out, will be carried out of the container 2 and can be removed by a suitable filter 52 to prevent sheaths and conductors which are no longer in use from accumulating in the container to possibly interfere with the establishment of subsequent connections. A reservoir of the mixture may be provided in series with the filter 52, pump 48, and container 2 and connected between the filter 52 and the pump 48.

Obviously, numerous variations and modifications may be made without departing from the present invention. Accordingly, it should be clearly understood that the forms of the invention described above and shown in the figures of the accompanying drawing are illustrative only and are not intended to limit the scope of the present invention.

What is claimed is:

1. Apparatus for making electrical connections, said apparatus comprising:

a container formed of electrically non-conductive material;

a plurality of electrodes mounted on said container in spaced relation and providing electrical communication between the interior and exterior surfaces of said container;

a mixture composed of thermosetting, electrically insulating material and powdered paramagnetic, electrically conductive material substantially filling said container and engaging said electrodes;

means for applying a magnetic field across said container between any selected pair of said electrodes to cause particles of said powdered material to become aligned between said selected pair of electrodes; and means for applying an electrical charge across said container between said selected pair of electrodes to weld said aligned particles into an electrically conductive path joining said selected pair of electrodes and to cause setting of said pastic to form an electrically insulating sheath about said conductive path.

2. The apparatus of claim 1 wherein the surface area of said electrodes is large compared to the cross-sectional area of said conductive path.

3. The apparatus of claim 1 wherein said means for applying an electrical charge includes means for shaping said charge to provide a peak to cause welding of said particles and a tail to cause setting of said thermosetting material.

4. The apparatus of claim 1 further comprising:

means for destroying said conductive path.

5. The apparatus of claim 4 further comprising:

means for effecting removal of insulating sheaths in which the conductive path has been destroyed.

6. The apparatus of claim 4 further comprising:

means for circulating said mixture through said container with sufficient force to effect removal of insulating sheaths in which the conductive path has been destroyed.

7. Apparatus for making electrical connections, said apparatus comprising:

a container formed of electrically non-conductive material;

a plurality of electrodes mounted on said container in spaced relation and providing electrical communication between the interior and exterior surfaces of said container;

a mixture composed of thermosetting electrically insulating material and powdered paramagnetic, electrically conductive material located within said container and engaging said electrodes;

means for applying a magnetic field across said container between a selected pair of said electrodes to cause particles of said powdered material to become aligned between said selected pair of electrodes; first means for applying an electrical charge across said container between said selected pair of electrodes to weld said aligned particles into an electrically conductive path joining said selected pair of electrodes and to cause setting of said plastic to form an electrically insulating sheath about said conductive path; and second means for applying a relatively large electrical charge across said container between said selected pair of electrodes to destroy said conductive path.

References Cited

UNITED STATES PATENTS

| | | | |
|---|---|---|---|
| 711,123 | 10/1902 | Rhoades | 252—513 X |
| 759,835 | 5/1904 | Stewart | 338—1 |
| 993,024 | 5/1911 | Burke | 338—1 X |
| 2,500,953 | 3/1950 | Libman | 338—1 X |
| 2,660,640 | 11/1953 | Wolf | 329—100 X |
| 2,849,312 | 8/1958 | Peterman | 29—108 X |
| 2,951,817 | 9/1960 | Myers | 252—511 |
| 3,041,566 | 6/1962 | Cloud | 338—32 |
| 3,255,512 | 6/1966 | Lachner et al. | 29—602 |

REUBEN EPSTEIN, Primary Examiner

U.S. Cl. X.R.

252—513; 329—100; 338—32, 224